(12) United States Patent
Cao et al.

(10) Patent No.: US 12,207,365 B2
(45) Date of Patent: Jan. 21, 2025

(54) METHOD AND APPARATUS FOR MANAGING LARGE AREA LIGHTING

(71) Applicant: SPORTSBEAMS LIGHTING, INC., Round Rock, TX (US)

(72) Inventors: Wei Cao, Shanghai (CN); Kevin C. Baxter, Tulsa, OK (US); Min Shi, Shanghai (CN); Fred H. Holmes, Clearwater, FL (US)

(73) Assignee: Sportsbeams Lighting, Inc., Round Rock, TX (US)

( * ) Notice: Subject to any disclaimer, the term of this patent is extended or adjusted under 35 U.S.C. 154(b) by 0 days.

(21) Appl. No.: 17/728,724

(22) Filed: Apr. 25, 2022

(65) Prior Publication Data
US 2022/0256665 A1    Aug. 11, 2022

Related U.S. Application Data

(63) Continuation of application No. 16/388,641, filed on Apr. 18, 2019, now abandoned.
(Continued)

(51) Int. Cl.
*H05B 45/20* (2020.01)
*H04N 5/262* (2006.01)
*H04N 23/56* (2023.01)
*H04N 23/61* (2023.01)
*H04N 23/617* (2023.01)
*H05B 47/125* (2020.01)
(Continued)

(52) U.S. Cl.
CPC ............. *H05B 45/20* (2020.01); *H04N 23/56* (2023.01); *H04N 23/61* (2023.01); *H04N 23/617* (2023.01); *H05B 47/125* (2020.01); *H05B 47/13* (2020.01); *H04N 5/2621* (2013.01); *H05B 47/19* (2020.01)

(58) Field of Classification Search
CPC ...... H04N 23/56; H04N 23/61; H04N 23/617; H04N 5/2621; H05B 45/20; H05B 47/125; H05B 47/13; H05B 47/19
See application file for complete search history.

(56) References Cited

U.S. PATENT DOCUMENTS

2012/0044350 A1*  2/2012  Verfuerth ............... H04N 23/66
                                                                 348/143
2015/0264765 A1   9/2015  Gerszberg
(Continued)

FOREIGN PATENT DOCUMENTS

CN     105191505 A    12/2015
KR     100863280 B1   10/2008

*Primary Examiner* — Amy R Hsu
(74) *Attorney, Agent, or Firm* — Scott R. Zingerman; David G Woodral; James F Lea, III

(57) ABSTRACT

A camera system for a venue including a camera mounted above the venue; a server including artificial intelligence (AI) adapted to follow a subject having a position; the AI adapted to generate aiming instructions based on the position of the subject. The camera being in communication with the server to receive and implement the aiming instructions. The camera system may include a wide area LED light mounted to a light pole. The camera may be mounted to the light pole. The camera system may include wide area LED light is in communication with the server. The wide area LED light produces light at an intensity and the server is adapted to vary the intensity based on the position of the subject.

12 Claims, 6 Drawing Sheets

Related U.S. Application Data

(60) Provisional application No. 62/666,935, filed on May 4, 2018, provisional application No. 62/659,522, filed on Apr. 18, 2018.

(51) Int. Cl.
*H05B 47/13* (2020.01)
*H05B 47/19* (2020.01)

(56) References Cited

U.S. PATENT DOCUMENTS

| | | |
|---|---|---|
| 2016/0286629 A1 | 9/2016 | Chen et al. |
| 2016/0323970 A1* | 11/2016 | Weber ................. G06F 18/2321 |
| 2017/0245349 A1 | 8/2017 | Van Der Brug |
| 2017/0257925 A1 | 9/2017 | Forbis et al. |
| 2018/0020346 A1 | 1/2018 | Li |
| 2018/0124446 A1* | 5/2018 | Tudor .................... H04N 23/63 |
| 2018/0158195 A1* | 6/2018 | Ono ....................... G03B 15/00 |
| 2018/0224551 A1* | 8/2018 | Kiy ....................... H05B 47/125 |
| 2018/0284269 A1* | 10/2018 | Anderson ............. G06F 3/0304 |
| 2018/0307979 A1* | 10/2018 | Selinger ................. H04N 7/183 |
| 2018/0308330 A1* | 10/2018 | Selinger ........... G08B 13/19663 |
| 2019/0253670 A1* | 8/2019 | Chien ....................... F21S 4/28 |
| 2019/0313024 A1* | 10/2019 | Selinger ........... G08B 13/19636 |

\* cited by examiner

METHOD AND APPARATUS FOR MANAGING LARGE AREA LIGHTING

CROSS REFERENCE TO RELATED APPLICATION

This application is a continuation of U.S. patent application Ser. No. 16/388,641 entitled METHOD AND APPARATUS FOR MANAGING LARGE AREA LIGHTING filed on Apr. 18, 2019 which claims the benefit of U.S. Provisional Application No. 62/659,522 filed Apr. 18, 2018, and U.S. Provisional Application No. 62/666,935 filed May 4, 2018, all herein incorporated by reference in their entirety for all purposes.

FIELD OF THE INVENTION

The present invention relates to a large area lighting system that is controlled by a computer such that users can be provided lighting in an automated way, and they can be charged for the use of this lighting, and special effects and features by the automated system.

BACKGROUND OF THE INVENTION

Large area lighting has typically been used in sports stadiums, parks, sea ports, prisons, airports, arenas, and similar large venue locations. These lights have evolved from tungsten, to sodium vapor, to HID, to Light Emitting Diodes (LEDs) being used presently. Originally the only controls were a very large on-off bull switch at the base of one of the poles. Turning off one of these big switches often dropped the user into total darkness with the prospect of blindly navigating out of the center of a sports stadium or venue with all of its tripping hazards. More recently there have been remote control schemes where users can make a phone call to a center where an operator or automated process turns on the lights remotely. This improvement only allows on-off control but was a huge improvement over the bull switch.

There have been tennis courts and similar installations that for many years have had coin or paper currency kiosks that allow the players to buy light by the hour. Insert a certain amount of currency and receive lighting for a fixed amount of time. If the players finished early the lights stayed on and there was no chance of a refund for the unused portion of the lighting.

Professional sports have evolved over the last few decades to a very different form of entertainment than before. Player statistics, big video screens, music, fan participation schemes, fire effects, fireworks, lasers, and in general a very fan involved experience. These presentations require a large staff and huge budgets by the sports venues but it pays off with a very satisfied fan base. Minor league and amateur sports, especially at the municipal level have not really evolved in this way at all.

At the same time some municipalities have shrunk from their typical responsibility of providing sports fields for all of their residents with private pay-to-play operators popping up to fulfill the needs of the amateur sports players. These sports field/arena operators take reservations and require payment from the teams at that time. It is often up to the team to divide up the costs amongst themselves when using these facilities.

At seaports and airports the continuous large area light traditionally used has been sodium vapor because of its long life without bulb replacement. The downside is that the light levels provided from Low Pressure Sodium Vapor (LPSV) in high mast situations is very low, coupled with the low visual acuity associated with that technologies extremely low color rendering index (CRI). When workers are loading and unloading ships there is not enough light to safely work under LPSV so HID lights are often installed adjacent to the LPSV fixtures and the HID fixtures are switched on by a timer when the work is underway. The problem is that HID takes several minutes to come up to full brightness and when the timer runs out the light goes out and needs a 20 minute cool down period before being able to come back on. This has led to workers occasionally working under only LPSV after a timer has gone out, and they were accidentally killed in the low light working conditions. LEDs have been used at ports but running them at the high brightness all of the time including times when they are not needed for working has added unacceptable power costs to operations.

What is needed is to solve all of these problems with one easy to use solution.

SUMMARY OF THE INVENTION

The present invention provides an automated way to manage, customize, and/or control large area lighting by individual users. Another aspect of the present invention includes a way to record, edit and produce customized video.

In one of the preferred embodiments of the inventive device is based on an array of large-area lights that are focused on a sports or entertainment venue and is controlled by a light server which is a computer or computers common to all of the lights, and that light server is connected to the internet (and the cloud). The computer is also accessible by apps that can then request lighting changes through the light server computer. Ideally the lights would be individually addressable.

The light server has several useful functions, one being the scheduling of turning on and off the lights. The light server can change, add, or modify this schedule based on inputs from app users. The light server also has similar functions regarding dimming of the lights for economy, security, safety, or entertainment.

The light server will have several layers of priority regarding users, the first priority being a facilities manager. A facilities manager could be the most important and will control timing of the lighting schedule and lockout periods. Coaches or referees could have the next level of priority and would be able to turn on and off and dim the lights in contradiction of the lighting schedule and lockout times. Players could have the lowest priority and could be allowed specific control of fields or courts where they are approved to play but would not be able to violate the lockout times. All activities of the users' communications with the light server will be verified and logged, with other levels of priority to be added as needed.

As used herein, the term user could be an individual user, such as a spectator, including without limitation a parent, relative, or fan of a particular performer (individual or member of a board) or participant or could be the participant, or a coach, etc. The term user also includes game officials or league official, venue official, director or other administrator who, for example, is responsible to talk, track or maintain and display typical information known to be displayed on scoreboards such as score, game clock, video and still content (including time, replay, streamed, or stock content) which may be related to the event or performance or advertising.

The light server would allow a facilities manager to remotely control the lights at a remote location. If individual fields needed control then they could be accessed independently and at the end of a field's use for the night the lights could be dimmed down to a very low level, too low to continue to be used for sports but bright enough that the public wouldn't trip over curbs and similar hazards as they left the facility. Many facilities are supported by fans commonly known as boosters, fans who donate money to improve facilities. These fans could be given an option on their app to control one or more lights (preferably during non-critical portions of a game) to show others which light was their contribution.

In one preferred embodiment the light server could also be used to pay for or schedule use for specific fields or courts by individual users who wanted to pay for light and/or a field/court by the hour (time) and by the lighting level (dimming). The individual users would have to have to pay via a credit card kiosk or by an app which has a credit card attached to it. For the same amount of money the individual user might opt for a longer period of time at a low light level for practice purposes, or they might opt for a shorter period of time at a higher light level for increased visibility. Multiple app users could connect to the light server in an additive way so that they could share the cost of a longer period of time at a high lighting level. The sports facility could also use this portal of the light server to charge for the use of individual fields and courts as well as lighting. This device of the present disclosure would allow municipalities to shift the costs of sports fields and/or courts from the taxpayers to the individuals who use the facilities.

Ideally the light server (computer) is also connected to a large video screen display and/or scoreboard and a sound system which allows the light server to control music, sounds, and video presentations, and scores to the sports venue's spectators in addition to the changes in lighting. In addition to the large area lights there could be multicolored lights such as Red, Green, Blue (RGB) lights that could be controlled by the light server. This light server could also be connected to special effects, such as smoke generators, firework's igniters, fountains, fireball generators, air cannons, and video cameras, just as examples.

A game official, such as referee, umpire, or scorekeeper could have an app that would allow them to control the video screen and/or scoreboard. A video screen could also be utilized as a scoreboard or both could be utilized in the lighting system of the present disclosure. When a score or change in the game is registered at the light server an app controlled by an individual user(s) could have the ability to trigger special effects. These special effects could include (preferably short or momentary): lighting changes, music, video presentations, sound effects, smoke generators, firework's igniters, and fireball generators. Specific changes on the scoreboard could trigger specific special effects, in baseball a full count would trigger a tense music sequence, and a home run would trigger a light chase and fireworks. There are traditional rally cries and taunting tunes and displays that are present in professional sports events as well as player and team theme songs and such that could be replicated in municipal or amateur sports settings via the inventive device's special effects. The audio effect of an organ playing traditional fight-chants at a junior league or even school hockey game would have a great emotional impact on the players and their spectators, just like in the major arenas.

The light server of the lighting system of the present disclosure could also provide an accounting of revenue, electrical usage, field usage, team scores, player stats etc.

Spectator app users (or individual users) could browse and download specific special effects for specific situations that could automatically trigger on the scoreboard changes or if they were not detrimental to the fairness of the game they could be triggered by the app user at will upon instruction by the app to the light server. There could be an associated charge for special effects to the app user (individual users). Leagues could also have access to a portion of the app that could allow them to set how much fan participation they would allow. Younger players might be too sensitive to some of the taunting effects, and those effects might be reserved for older players by the league, just as an example.

The app and light server could be used to tally and display player stats on the scoreboard or video display, it could become the league's storehouse of player stats or it could simply import them from an external source, such as a league's server.

In another preferred embodiment the light server could be connected to video cameras and a video recording system. This system would have several motion tracking cameras and at least one of them would be projected on the large video screen a good portion of the time, especially during periods of motion. App users (game officials or individual users) could trigger instant replays, record an isolation view of an individual player, or receive a recording of an entire game. Isolated views of individual players could show their statistics, such as a close-up of a quarterback, center, or batter.

As a game is played, the players could be video recorded and their performance could be analyzed in real time by Artificial Intelligence (AI). The same user app that allows for controlling the lights and special effects would also be used to receive constructive coaching from AI.

As used herein the terms Artificial intelligence. AI, and/or A.I. are terms known by one of skill in the art to refer to computer technology that takes big data and then studies and learns from it to make small algorithms that then perform tasks similar or better than a human can perform. An example is with the panning and tilting of camera bases in order for a camera to follow movement. A.I. can attempt to pan and tilt in order to follow a moving sports player and then learn the speed, resolution and limitations of the motors that actually operate the base. After a few observations of the player's movement and the shortcomings of the operations of the motors (hardware) it can modify the algorithm that activates the motors in order to do a better job the second time. This is repeated many times until the algorithm smoothly follows a moving player as good as or better than a human can.

In a preferred embodiment the light server could take in data from real world sensors and allow lighting and special effects that could be completely dynamic or canned based on the input. A smartphone could transmit its movement to the light server where the smartphone was in a performer's (or game official's or individual user's) pocket, and the lighting and special effects could follow the performer's body movements. For example, when the performer (game official or individual user) jumped the light would go up in brightness, when the performer (or game official or individual user) swayed to the left or right (danced) the light would change color, etc. Music performances could also trigger special effects and lighting changes based on the music's frequency, tempo, or volume. There could be a DMX output from the light server to allow the output of data to almost any DMX fixture or device. Using this inventive device all of the fans (individual users) from one team that have apps could participate in a movement competition, their movement could be judged collectively against all of the fans from another team. This inventive device would allow fans' movements to control the lighting at a sports or entertainment event.

In a further preferred embodiment, the light server could take in input from Passive Infrared (PIR) motion detectors or motion detecting video cameras. These motion sensors could detect motion in areas such as car dealership lots, prisons, industrial locations and running tracks or trails. Lights in such installations would be preset at a low level by the inventive light server computer and then would turn the lights up in brightness but only in the immediate area of the motion or person detected. They could be dimmed up slowly to take away any jumpiness or abruptness so that it would be a gentle change. The light server could be in communication with an app or a car dealer/salesmen's smartphone in the case of a car lot, or an app on a guard's smartphone in the case of a prison. The lights brightness alone would alert one to movement. This would allow for a large savings in power but with reasonable interim brightness.

The present disclosure relates to a lighting system for large area lighting, including a light server in communication with at least one wide area LED lights wherein the light server is adapted for controlling and scheduling the at least one wide area LED light; an app in communication with the light server such that the app is adapted for controlling the light server. The at least one wide area LED light is preferably at least 300 watts. The lighting server may include at least one timer. The timer could be a timing device or generated by software.

The lighting system may also include special effects controlled by the light server. The special effects may include at least one smoke generator controlled by the light server. The special effects may also or alternatively include at least one sound effects generator controlled by the light server. The special effects may also or alternatively include fireworks controlled (launched) by the light server. The special effects may also or alternatively include at least one video display controlled by the light server. The video display may be a large video monitor as known and used in sporting events or it may be a small scoreboard. The video display may display information supplied to the light server by a user (game official or individual user, for example). The video display may display information stored on the light server as directed by a user. The video display may display information stored on the light server as directed by a game official.

The lighting system of the present disclosure may include a light server which receives input from one or more smart phones including motion sensors. The information from the motion sensor could be input into the app such that particular movement input triggers a customized lighting display (strobe, color, etc.) or video display or other special effect.

The light server may include multiple levels of user priority.

The app may be adapted to receive control input from a user. The control information from the app may be payment information derived in the app from the user. The app may be adapted to receive time information from the user. This could be, for example, the time the user requires lighting for a tennis or basketball court or soccer pitch. The app may also or alternatively be adapted to receive dimming information from the user. The user may be an individual user, game official, facilities manager, etc.

The present disclosure also includes a method for controlling or scheduling the output of large area lighting. The method including providing a wide area LED light of at least 300 watts; adapting an app for controlling a light server; the light server adapted for controlling said wide area LED light.

The foregoing has outlined in broad terms the more important features of the invention disclosed herein so that the detailed description that follows may be more clearly understood, and so that the contribution of the instant inventors to the art may be better appreciated. The instant invention is not limited in its application to the details of the construction and to the arrangements of the components set forth in the following description or illustrated in the drawings. Rather the invention is capable of other embodiments and of being practiced and carried out in various other ways not specifically enumerated herein. Additionally, the disclosure that follows is intended to apply to all alternatives, modifications and equivalents as may be included within the spirit and the scope of the invention as defined by the appended claims. Further, it should be understood that the phraseology and terminology employed herein are for the purpose of description and should not be regarded as limiting, unless the specification specifically so limits the invention.

DETAILED DESCRIPTION OF THE PREFERRED EMBODIMENTS

The embodiments herein and the various features and advantageous details thereof are explained more fully with reference to the non-limiting embodiments that are illustrated in the accompanying drawings and detailed in the following description. Descriptions of well-known components and processes and manufacturing techniques are omitted so as to not unnecessarily obscure the embodiments herein. The examples used herein are intended merely to facilitate an understanding of ways in which the invention herein may be practiced and to further enable those of skill in the art to practice the embodiments herein. Accordingly, the examples should not be construed as limiting the scope of the claimed invention.

Before explaining the present invention in detail, it is important to understand that the invention is not limited in its application to the details of the construction illustrated and the steps described herein. The invention is capable of other embodiments and of being practiced or carried out in a variety of ways. It is to be understood that the phraseology and terminology employed herein is for the purpose of description and not of limitation.

Figure 1:
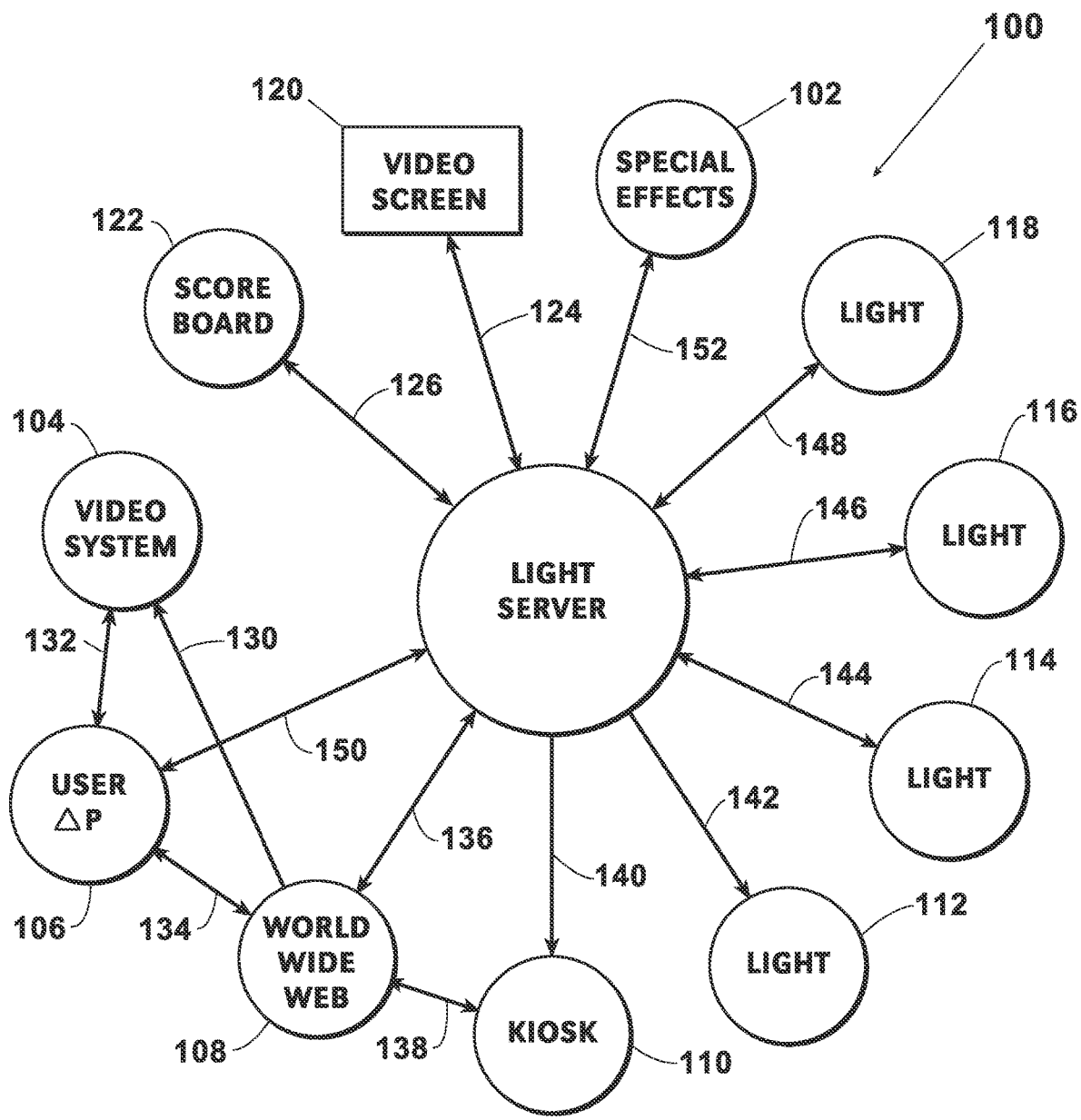
FIG. 1 depicts a block diagram of the preferred configuration of the inventive lighting system.

Referring now to the drawings, wherein like reference numerals indicate the same parts throughout the several views, a representative lighting as a service system 100 is shown in its general environment in FIG. 1. In one preferred embodiment, a plurality of LED based large area lighting fixtures 112-118 are positioned to light a sporting event or entertainment venue. Large area lights 112-116 are ideally LED white light fixtures whereas large area light 118 may be an RGB fixture. Light 116 may be a white light fixture but it may be bi-color where one color is warm white and the other color is a cool white and the fixture can cross-fade between these two colors by commands from the light server 101 and make any selected particular color temperature between 2700K to 6000K as an example, without limitation. The lights 112-118 are connected to the light server 101. The light server 101 may be also connected to a user's smart phone or tablet application 106 both directly by Bluetooth or Wi-Fi or other known protocol 150 or over cell networks, Bluetooth, or Wi-Fi 134 to the web 108 and cloud 107 which then communicates to the light server 101 via the internet 136. Communication links 142-148 can be made of many technologies such as DMX, Ethernet, Wi-Fi, cell modem, to name a few non-limiting examples.

The light server 101 may also be connected to a special effects 102 via link 152 in an embodiment where the light server 101 can control special effects 102. The special effects 102 could include one or more of the following, fireworks, fireballs, lasers, smoke generators, confetti, cannon blasts, sound effects, searchlights, drones, and music, just as non-limiting examples. The communications link 152 could be one of many communications schemes which are well known in the art.

A spectator app 106 user can select a special effect 102 or lighting 142-148 change from a large number listed on either the light server 101 or from the web 108. A referee app user 106 could enter a scoring change to the light server which would trigger a special effects display 102, or video 120, or scoreboard 122, because previously a spectator app 106 user had selected a special effect 102 when a particular team scored. The user may be charged and pay for special effects 102. Similarly a user app 106 can select reservations and payment for use of a facility such as a field, pitch, or arena through the light server 101 which communicates to the web 108 and possibly to the facilities website.

Figure 2:
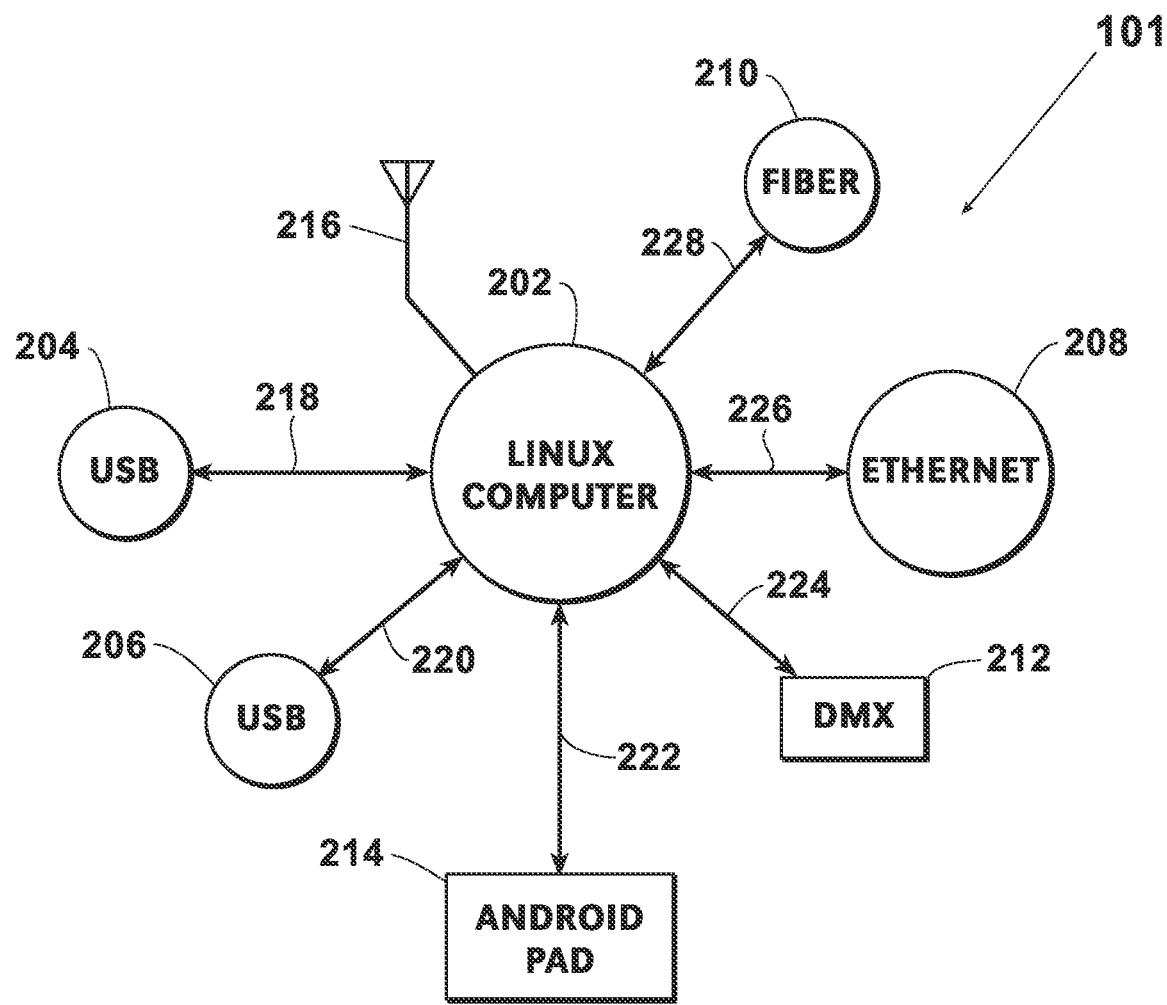
FIG. 2 depicts a block diagram of the light server and its connections.

Referring now to the next drawing, the light server 101 is shown in particular detail in FIG. 2. In a preferred embodiment, the light server 101 has at its heart a computer 202, wherein a Linux based computer 202 is particularly suited, which has several ways to communicate out to the world such as, without limitation, an Ethernet port 208, a fiber optics communication port 210, serial ports, USB 218 and DMX-512 212 or other such communication port known to those of skill in the art. The computer would also have wireless options such as Wi-Fi 216 and Bluetooth 216. The computer 202 would ideally also have a computer tablet (such as an Android or Apple iPad base) 214 that provided a touchscreen interface. The Linux computer 202 should also have substantial storage and the ability to receive software updates over the web. This physical computer 202 would then be connected to the internet where a cloud version of light server 101 would reside as a mirror or backup. This cloud version may be identical to computer 202. The local physical light server 101 would be able to address most functions when internet connection was not available.

Figure 3:
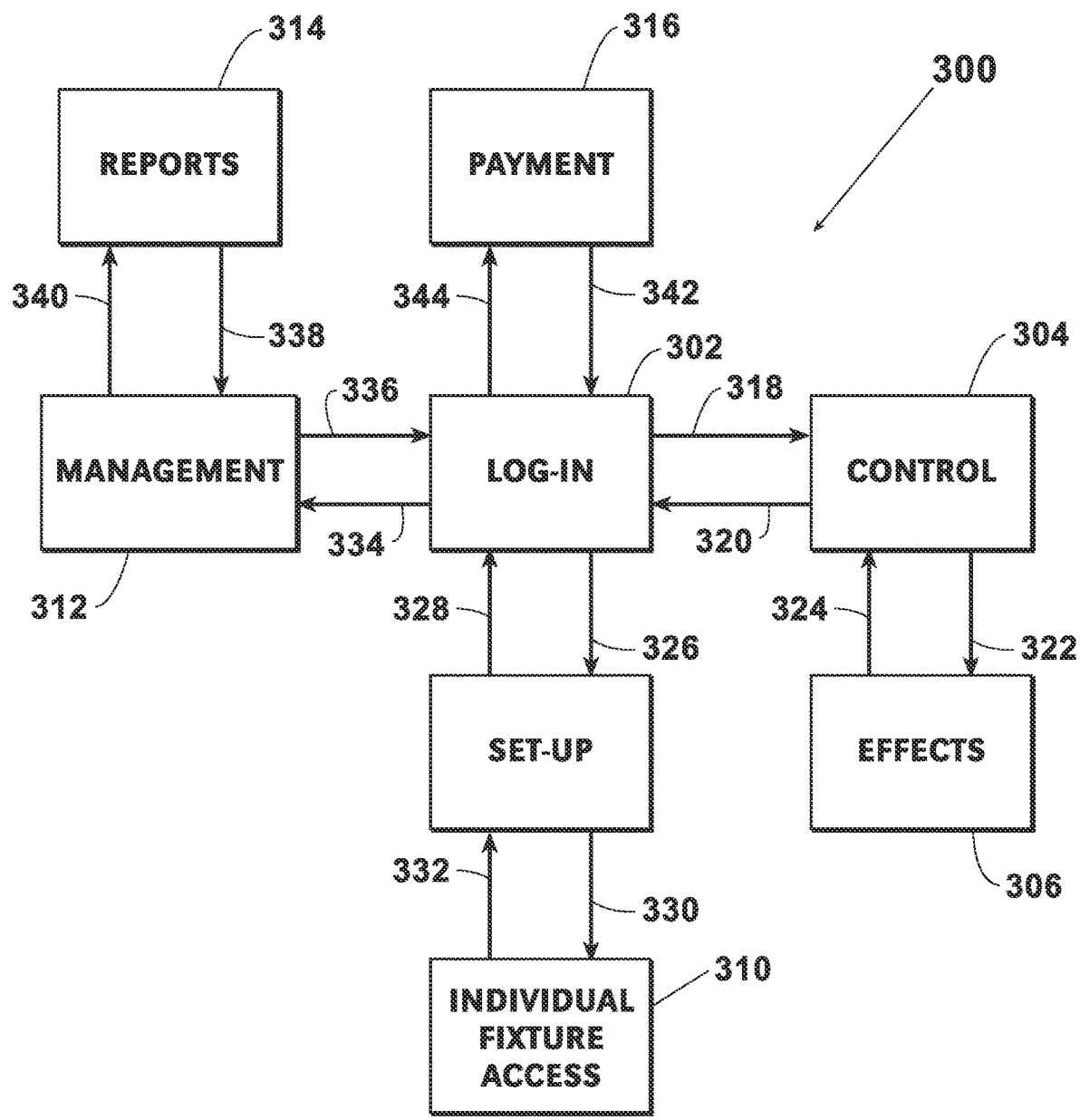
FIG. 3 shows the progression of screens of the app.

Referring now to the next drawing, the smart phone application screens 106 is shown in FIG. 3. Referring now to the next drawing, the smart phone and computer application screens 300 is shown in FIG. 3. The app drops the user into screen 302 which is the log-in screen. This screen is the home screen that the user navigates from. The common user would most likely select and go to 318 the control screen 304 in order to operate the lights. Once completed they might go to the Effects screen 306 or return 320 to the log-in/home screen 302 and then go to 344 the Payment screen 316. After choosing the payment method or conditions the user would return 342 to the Log-in/Home screen. Only managers would be allowed to go 334 to the Management screen 312. There they can set other user's priority levels and make scheduling and other high-level changes. They can also go to 340 a reports screen 314 where they can generate reports that show hours of use, power usage, cost savings, and other similar charts and spreadsheets. Managers would also have access to the Set-up screen 308 where the system is configured, from there they could go to 330 to the Individual fixture screens 310 where each individual fixture's information, location, address, and connection is defined.

Figure 4:
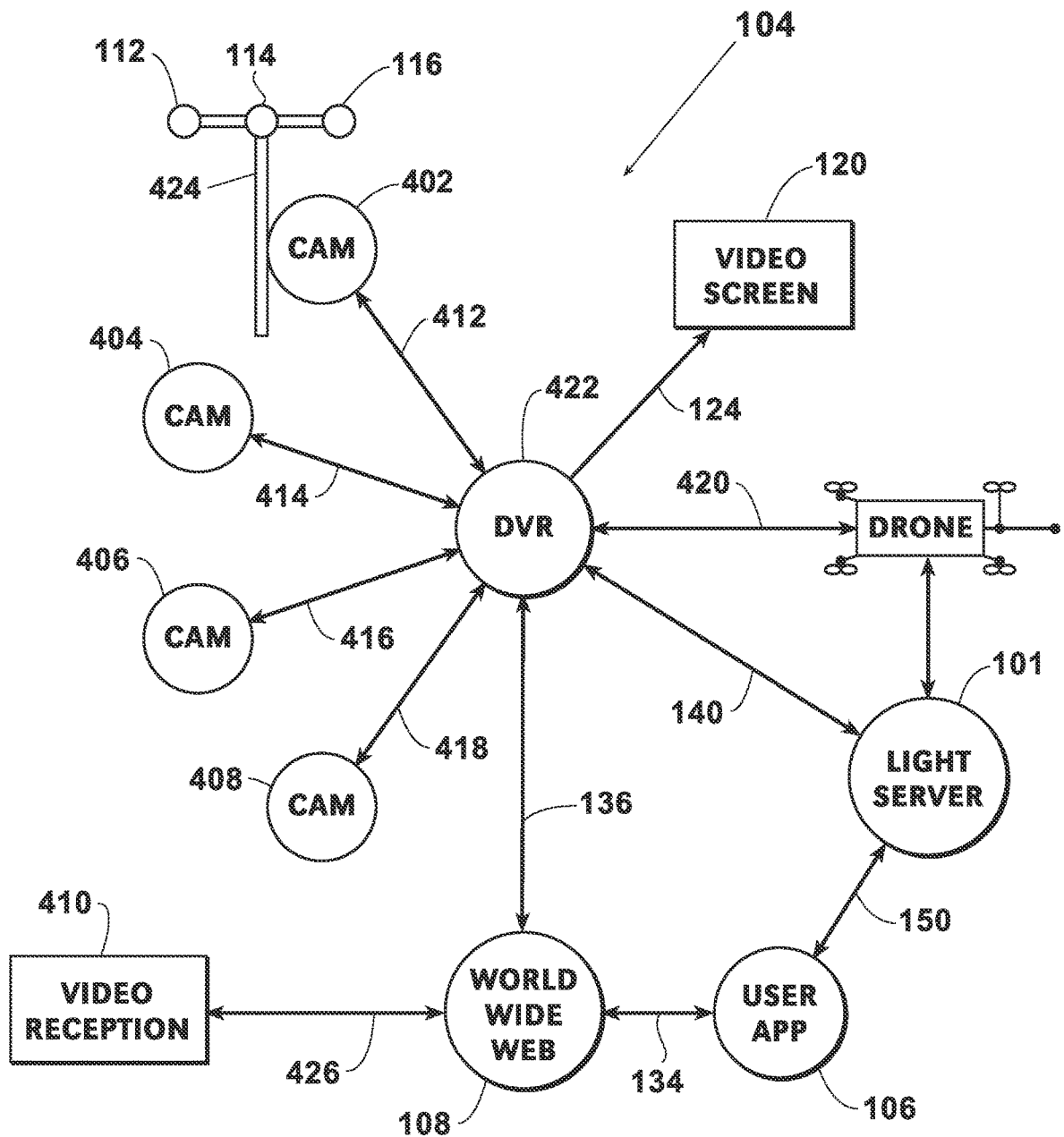
FIG. 4 shows a diagram of the video system.

Referring now to the next drawing, the video system 104 is shown in FIG. 4. In a preferred embodiment, a combined Digital Video Recorder (DVR) and video switch 422 is connected to a plurality of cameras 402-408 by their respective connections 412-418. These connection technologies are well known in the art and depending on the location and technical requirements the best connection method would be preferred. Additionally, a drone's 428 camera could be wirelessly connected 420 to the DVR 422. Flight instructions for the drone 428 would come through wireless connection 152 from the light server 101 and the video from the drone's 428 camera could use this same connection path but would then need to be relayed to the DVR through connection 140. The cameras 412-418 would ideally have Pan Tilt Zoom (PTZ) mounts and the cameras would also have automatic motion tracking capabilities, these capabilities are well known in the art. The cameras would be generally aimed at the playing field or stage and there would be a variety of views.

The view of camera 402 would be mounted on one of the light poles 424 for a high angle view. Camera 404 could be a bullet camera, a small waterproof camera, mounted directly over or beside the point where scoring occurs. This location could be at the goal line in football, over the net in hockey, over the plate in baseball, or looking down at the rim in basketball, just as non-limiting examples. Camera 406 could be a camera with a telescopic lens that would be fixed and focused on a point of activity, such as a batter in baseball or a quarterback in football. Camera 408 could use its motion tracking or AI to follow a soccer ball during a game. The camera in drone 428 could fly over the field at parts of the game such as at inning changes, where there was a great deal of movement over the entire field. These same cameras 402-408, 428 (drone camera) and their capabilities could be used for performances such as concerts, monster truck meets, and special events. A user's app 106 could use the light server 101 to communicate aiming instructions (which may be generated by AI) through the DVR 422 to a camera 406 in order to record a specific player or performer. There could be enough cameras so that all of the players could be isolated on separate camera views if there were users willing to go to their apps and command them. The DVR 422 would record all of the video feeds from the cameras 402-408, 428 and each app user could have a different final edit of the recording based on their favorite player. This final edit could be live streamed over the web 108 to distant video recipients 410 or it could be transmitted or viewed at a later date, or made available to other video recipients 410 which would be social media sites, like Facebook, YouTube, WeChat and others.

The video screen 120 would receive images from the DVR 422 that could be single or multi-frame. The DVR 422 would switch to particular cameras based on priority and the motion detecting cameras 408 or AI would take priority during periods of activity. Activity near the scoring location by camera 404 may take the highest priority. During periods of low activity the switching could slowly cycle through all of the views. This same video feed could be sent to app users or made available to the video recipients 410.

Figure 5:
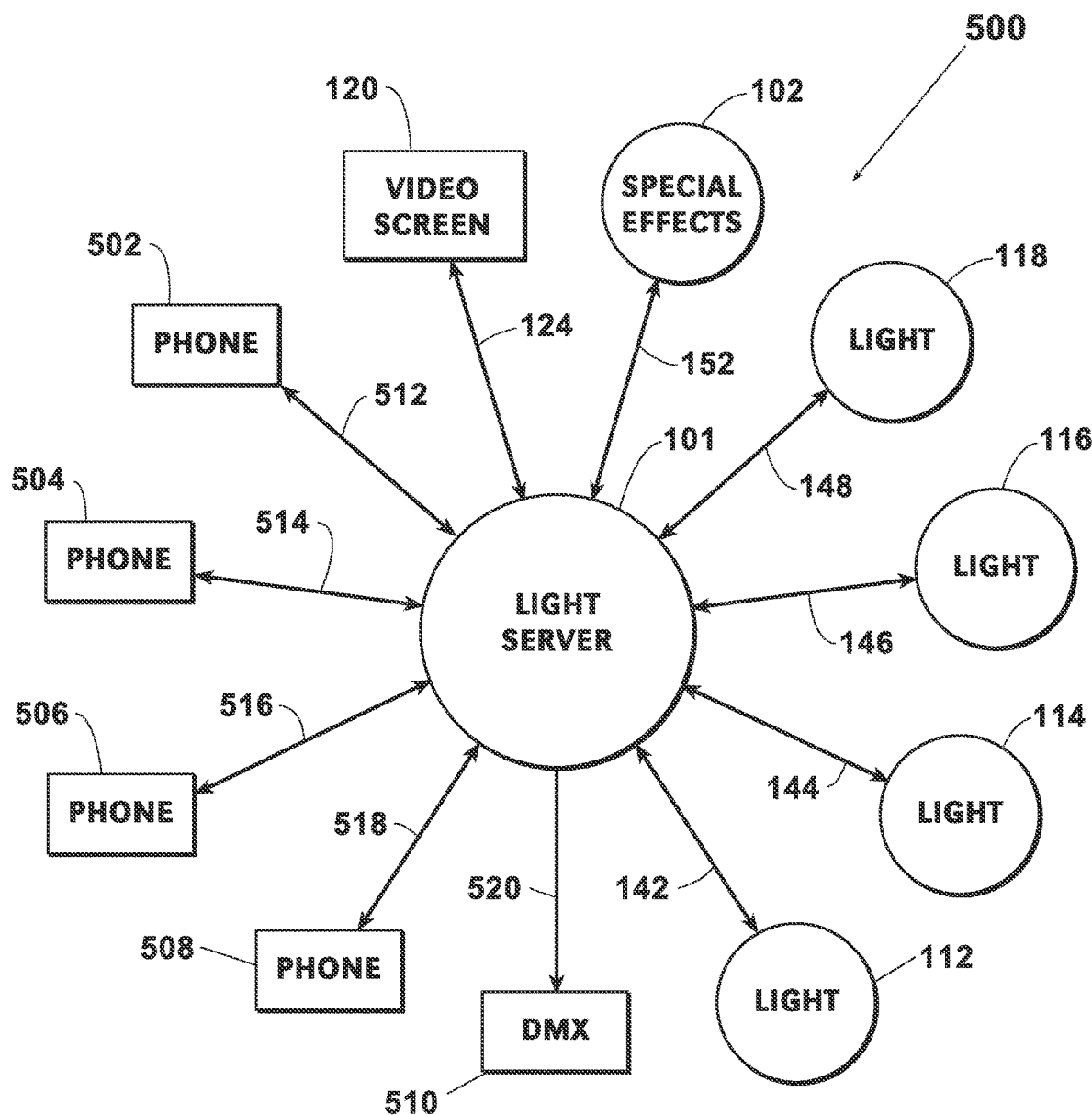
FIG. 5 depicts a block diagram of the preferred configuration of the motion to light system.

Referring now to the next drawing, the motion-to-light system 500 is shown in FIG. 5. In a preferred embodiment, a motion-to-light system would have a smart phone 502 that had in inertial motion chip or chips that could measure the smart phone's motion and transmit that data to the light server 101. The light server 101 would then use that motion data and make relative changes to the lights 112-118 as well as changes to special effects 102 and possibly change images on the video screen 120. The motion chips would determine x, y, and z movements along with, rotation, heading, the rate of change, and combinations of all of these. These motion parameters would influence the brightness and color of the lights as well as the amount and timing of the special effects. Multiple smart phones 502-508 would all be in communication with the light server 101 and could have the sum of their movements determine the changes in lighting and special effects. The communications between the smartphones 502-508 and the light server 101 would probably be a variety of different communications such as the smartphones 502-508 communicating via a cell network 134 to the web 108 which would then connect to the light server 101, but such communication paths are well understood by one skilled in the art. Smartphones 502 and 504 could add their motion sums together and compete against the sum of smartphones' 506 and 508 motions, with the result displayed by the light server 101 in making changes to the lights 112-118 and the special effects 102, and the video screen 120. The light server 101 could also communicate with a DMX-512 interface 510 and that interface could talk to other lights (which may or may not be located at the stadium/venue). The light server 101 and DMX-512 interface 212 could be combined into one device.

Figure 6:
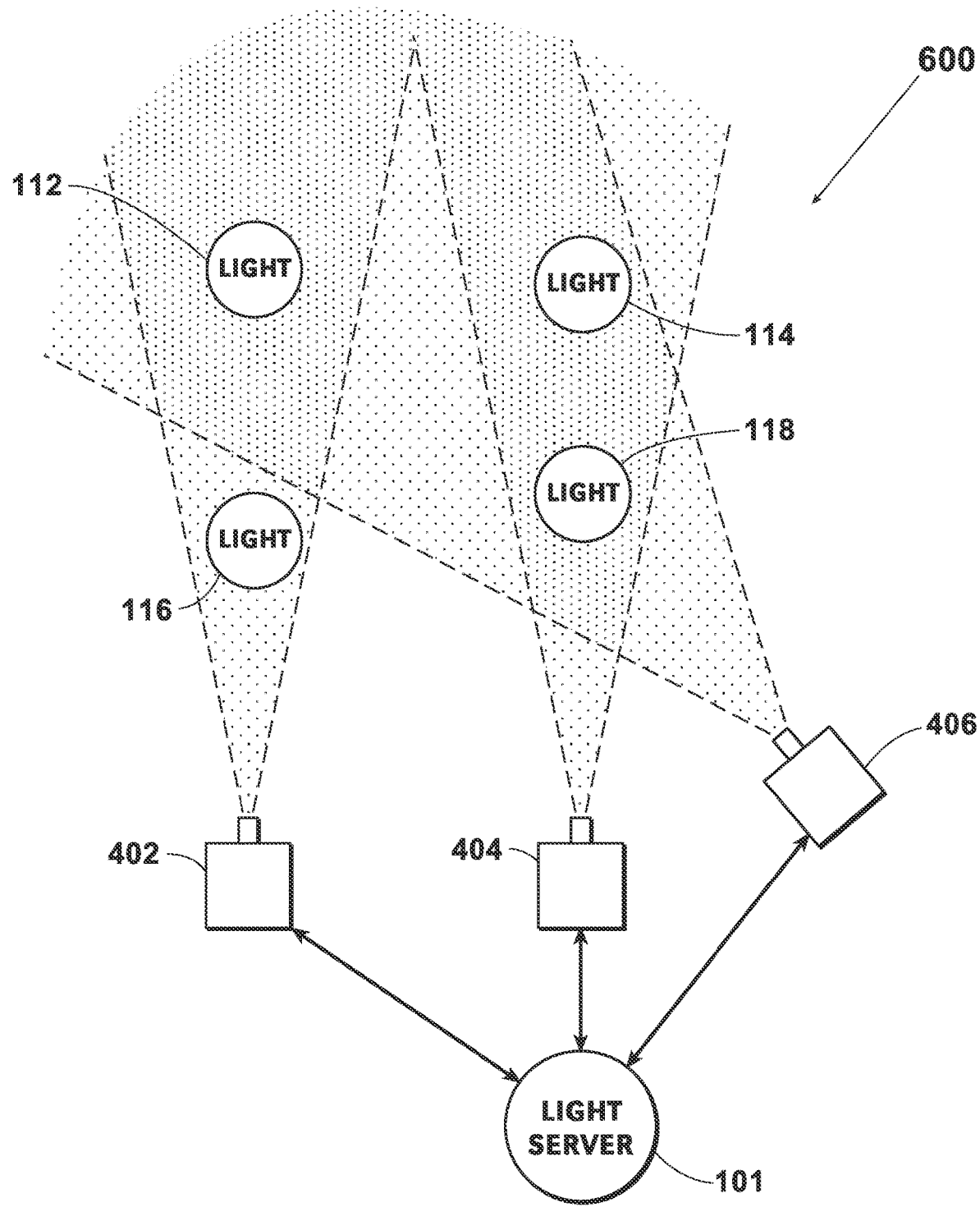
FIG. 6 shows a diagram of the area reacting lighting system.

Referring now to the drawing of the area reacting lighting system 600 is shown in FIG. 6. In a preferred embodiment, an array of large area lights 112-118 are laid out in a pattern as shown. The motion detecting cameras or PIR motion sensors or AI 402-406 have fields of view depicted by the dotted lines. Camera/sensor 402 has a view of lights 116 and 112, camera/sensor 404 has a view of lights 118 and 114, and camera/sensor 406 has a view of lights 118, 112, and 114.

In the preferred embodiment lights 112-118 may all be turned on but dimmed to 20% brightness, when camera/sensor 402 or AI sees motion it turns lights 112 and 116 up to full brightness. After one minute with no detected motion the lights 112 and 116 are returned to 20% brightness. Similarly when camera sensor or AI 404 sees motion lights 118 and 114 are turned on to full brightness. Light server 101 preferably uses the internet to contact security.

Thus, the present invention is well adapted to carry out the objects and attain the ends and advantages mentioned above as well as those inherent therein. While presently preferred embodiments have been described for purposes of this disclosure, numerous changes and modifications will be apparent to those skilled in the art. Such changes and modifications are encompassed within the scope and spirit of this invention.

It is to be understood that the terms "including", "comprising", "consisting" and grammatical variants thereof do not preclude the addition of one or more components, features, steps, or integers or groups thereof and that the terms are to be construed as specifying components, features, steps or integers.

If the specification or claims refer to "an additional" element, that does not preclude there being more than one of the additional element.

It is to be understood that where the claims or specification refer to "a" or "an" element, such reference is not be construed that there is only one of that element.

It is to be understood that where the specification states that a component, feature, structure, or characteristic "may", "might", "can" or "could" be included, that particular component, feature, structure, or characteristic is not required to be included.

Where applicable, although state diagrams, flow diagrams or both may be used to describe embodiments, the invention is not limited to those diagrams or to the corresponding descriptions. For example, flow need not move through each illustrated box or state, or in exactly the same order as illustrated and described.

Methods of the present invention may be implemented by performing or completing manually, automatically, or a combination thereof, selected steps or tasks.

The term "method" may refer to manners, means, techniques and procedures for accomplishing a given task including, but not limited to, those manners, means, techniques and procedures either known to, or readily developed from known manners, means, techniques and procedures by practitioners of the art to which the invention belongs.

The term "at least" followed by a number is used herein to denote the start of a range beginning with that number (which may be a ranger having an upper limit or no upper limit, depending on the variable being defined). For example, "at least 1" means 1 or more than 1. The term "at most" followed by a number is used herein to denote the end of a range ending with that number (which may be a range having 1 or 0 as its lower limit, or a range having no lower limit, depending upon the variable being defined). For example, "at most 4" means 4 or less than 4, and "at most 40%" means 40% or less than 40%. Terms of approximation (e.g., "about", "substantially", "approximately", etc.) should be interpreted according to their ordinary and customary meanings as used in the associated art unless indicated otherwise. Absent a specific definition and absent ordinary and customary usage in the associated art, such terms should be interpreted to be ±10% of the base value.

When, in this document, a range is given as "(a first number) to (a second number)" or "(a first number)-(a second number)", this means a range whose lower limit is the first number and whose upper limit is the second number. For example, 25 to 100 should be interpreted to mean a range whose lower limit is 25 and whose upper limit is 100. Additionally, it should be noted that where a range is given, every possible subrange or interval within that range is also specifically intended unless the context indicates to the contrary. For example, if the specification indicates a range of 25 to 100 such range is also intended to include subranges such as 26-100, 27-100, etc., 25-99, 25-98, etc., as well as any other possible combination of lower and upper values within the stated range, e.g., 33-47, 60-97, 41-45, 28-96, etc. Note that integer range values have been used in this paragraph for purposes of illustration only and decimal and fractional values (e.g., 46.7-91.3) should also be understood to be intended as possible subrange endpoints unless specifically excluded.

It should be noted that where reference is made herein to a method comprising two or more defined steps, the defined steps can be carried out in any order or simultaneously (except where context excludes that possibility), and the method can also include one or more other steps which are carried out before any of the defined steps, between two of the defined steps, or after all of the defined steps (except where context excludes that possibility).

Thus, the present invention is well adapted to carry out the objects and attain the ends and advantages mentioned above as well as those inherent therein. While presently preferred embodiments have been described for purposes of this disclosure, numerous changes and modifications will be apparent to those skilled in the art. Such changes and modifications are encompassed within the spirit of this invention as defined by the appended claims.

What is claimed is:

1. A camera system for a sporting venue, comprising:
   a light pole supporting a wide area LED light adapted for illuminating at least a portion of the sporting venue;
   a camera mounted to said light pole;
   said camera adapted for motion detection to follow a moving sports player selected from a plurality of sports players capable of moving in the sporting venue;
   said camera adapted to capture video images of said sports player;
   an app adapted for a spectator to produce customized video from said captured video images of said sports player.

2. A camera system for a sporting venue including a plurality of subjects capable of moving within the sporting venue, comprising:
   a camera mounted above the sporting venue;
   a server including artificial intelligence (AI) adapted to follow a subject selected from the plurality of subjects;
   said subject having a position;
   said AI adapted to generate aiming instructions based on said position of said selected subject within the sporting venue;
   said camera in communication with said server to receive said aiming instructions;
   said camera adapted to implement said aiming instructions;
   said camera adapted to capture video images of said subjects;
   an app adapted for a spectator to produce video from said captured video images of said subjects.

3. The camera system of claim 2 wherein said camera is mounted on a pan, tilt, zoom mount.

4. The camera system of claim 2 wherein said camera includes a telescopic lens.

5. The camera system of claim 2 wherein said selected subject is moving and said server is adapted for motion tracking.

6. The camera system of claim 2 further including a wide area LED light mounted to a light pole and said camera is mounted to said light pole.

7. The camera system of claim 6 wherein said wide area LED light is in communication with said server.

8. The camera system of claim 7 wherein said wide area LED light produces light at an intensity and said server is adapted to vary said intensity.

9. The camera system of claim 8 wherein said server is adapted to vary said intensity based on said position of said subject.

10. The camera system of claim 2 including a plurality of selected subjects each having a position and said AI adapted to follow the position of each of said plurality of selected subjects.

11. The camera system of claim 10 wherein said AI adapted to generate an aiming instruction based upon said position of each said selected subject.

12. The camera system of claim 11 including a plurality of cameras each adapted to receive and implement an aiming instruction.

* * * * *